United States Patent
Perlin (10) Patent No.: US 12,141,930 B2
(45) Date of Patent: Nov. 12, 2024

(54) IMPLEMENTING SHARED MIXED REALITY

(71) Applicant: Kenneth Perlin, New York, NY (US)

(72) Inventor: Kenneth Perlin, New York, NY (US)

(*) Notice: Subject to any disclaimer, the term of this patent is extended or adjusted under 35 U.S.C. 154(b) by 0 days.

(21) Appl. No.: 18/213,448

(22) Filed: Jun. 23, 2023

(65) Prior Publication Data

US 2023/0419619 A1    Dec. 28, 2023

Related U.S. Application Data

(60) Provisional application No. 63/355,889, filed on Jun. 27, 2022.

(51) Int. Cl.
| | |
|---|---|
| *G06T 19/00* | (2011.01) |
| *G06F 3/01* | (2006.01) |
| *G06T 7/70* | (2017.01) |
| *G06T 15/20* | (2011.01) |
| *H04N 13/239* | (2018.01) |

(52) U.S. Cl.
CPC ............ *G06T 19/006* (2013.01); *G06F 3/011* (2013.01); *G06F 3/013* (2013.01); *G06T 7/70* (2017.01); *G06T 15/20* (2013.01); *G06T 2207/10012* (2013.01); *G06T 2219/024* (2013.01); *H04N 13/239* (2018.05)

(58) Field of Classification Search
CPC ... G06T 19/006; G06T 7/70; G06T 2219/024; G06F 3/011–013; G06F 3/017
See application file for complete search history.

(56) References Cited

U.S. PATENT DOCUMENTS

| | | | | |
|---|---|---|---|---|
| 9,922,462 | B2* | 3/2018 | Miller | G06T 13/40 |
| 10,359,862 | B2* | 7/2019 | Moon | G06F 3/017 |
| 10,698,535 | B2* | 6/2020 | Norieda | G06F 3/014 |
| 10,983,594 | B2* | 4/2021 | Koker | G06F 3/04815 |
| 11,052,288 | B1* | 7/2021 | Berme | A63B 26/003 |
| 11,294,453 | B2* | 4/2022 | Olah-Reiken | G06T 19/006 |
| 11,315,215 | B2* | 4/2022 | Burgoyne | G06T 19/20 |
| 11,320,958 | B2* | 5/2022 | Deliz Centeno | G06F 3/013 |
| 11,409,358 | B2* | 8/2022 | Perlin | G06F 3/04817 |
| 11,577,159 | B2* | 2/2023 | Mandella | A63F 13/53 |
| 11,829,525 | B2* | 11/2023 | Koker | G06F 3/147 |
| 2010/0245387 | A1* | 9/2010 | Bachelder | G06T 19/006 |
| | | | | 345/633 |
| 2016/0296839 | A1* | 10/2016 | Brav | A63F 13/213 |
| 2016/0307374 | A1* | 10/2016 | Kurz | G06F 3/012 |
| 2016/0320833 | A1* | 11/2016 | Schuman | G06F 3/147 |
| 2017/0212593 | A1* | 7/2017 | Gustin | G06F 3/016 |

(Continued)

*Primary Examiner* — Patrick F Marinelli
(74) *Attorney, Agent, or Firm* — Ansel M. Schwartz (57) ABSTRACT

A system for implementing a shared mixed reality experience to participants in a same physical room having a plurality of VR headsets, each of which is adapted to be worn by a participant in the room. Each VR headset having a forward-facing color camera stereo pair. The system includes a computer in communication with at least one of the VR headsets. The system includes a memory in communication with the computer. The memory storing an original 3D digital representation of the room. The computer calculates a rendered VR scene for the at least one of the headsets from a point of view of each of the participant's two eyes, based on the VR headset's current position and orientation. A method for implementing a shared mixed reality experience to participants in a same physical room.

15 Claims, 3 Drawing Sheets

(56) References Cited

U.S. PATENT DOCUMENTS

| | | | |
|---|---|---|---|
| 2018/0150186 A1* | 5/2018 | Norieda | G06F 3/0304 |
| 2018/0246565 A1* | 8/2018 | Moon | G06F 3/016 |
| 2018/0260023 A1* | 9/2018 | Perlin | G06F 1/1626 |
| 2020/0004329 A1* | 1/2020 | Koker | G06F 3/167 |
| 2021/0081031 A1* | 3/2021 | Perlin | G06F 3/04817 |
| 2021/0149190 A1* | 5/2021 | Johnson | G06F 3/011 |
| 2021/0283496 A1* | 9/2021 | Mandella | H04N 23/60 |
| 2021/0382548 A1* | 12/2021 | Koker | G06F 3/011 |
| 2022/0264079 A1* | 8/2022 | Perlin | G06T 7/74 |
| 2022/0374070 A1* | 11/2022 | Perlin | G06F 3/0484 |
| 2023/0107586 A1* | 4/2023 | Ho | G06F 3/014 345/7 |
| 2023/0343041 A1* | 10/2023 | Perlin | G06F 3/0346 |
| 2023/0419619 A1* | 12/2023 | Perlin | G06T 7/70 |
| 2024/0013483 A1* | 1/2024 | Perlin | G06T 5/50 |

* cited by examiner

IMPLEMENTING SHARED MIXED REALITY

CROSS-REFERENCE TO RELATED APPLICATIONS

This is a nonprovisional of U.S. provisional patent application Ser. No. 63/355,889 filed Jun. 27, 2022, incorporated by reference herein.

FIELD OF THE INVENTION

The present invention is related to providing participants in a same physical room, a shared mixed virtual reality. More specifically, the present invention is related to providing participants in a same physical room, a shared mixed virtual reality utilizing VR headsets, each of which has a forward-facing color camera stereo pair.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

When multiple participants share a virtual reality (VR) experience in the same physical room, they cannot physically see each other. To allow those participants to see each other, and thereby to create a socially shared mixed reality experience, prior work has proceeded in one of two ways. Either (1) participants are shown to each other as synthetic avatars of themselves, or else (2) the shared experience is staged within a prepared room, such as a room with green colored walls, so that the VR headsets can use forward facing cameras to continue to see the other participants in the room, while a green screen algorithm is used to visually replace the surrounding walls with a shared synthetic VR world.

BRIEF SUMMARY OF THE INVENTION

The present invention pertains to a system for implementing a shared mixed reality experience to a first participant and a second participant in a same physical room. The system comprises a first VR headset having a forward-facing color camera stereo pair worn by the first participant in the physical room. The system comprises a second VR headset having a forward-facing color camera stereo pair worn by the second participant in the physical room. The system comprises a computer in communication with the first and second VR headsets. The system comprises a memory in communication with the computer. The memory storing an original 3D digital representation of the room. The computer calculates a rendered 3D VR scene for the first VR headset from a point of view of the first participant's two eyes, based on the first VR headset's current position and orientation. Anything in the room that is different from the original 3D digital representation of the room is visible to the first participant in the rendered 3D VR scene. Any part of the room that was present in the original 3D digital representation of the room becomes visibly replaced by the rendered 3D VR scene. The computer calculates a rendered 3D VR scene for the second VR headset from a point of view of the second participant's two eyes, based on the second VR headset's current position and orientation. Anything in the room that is different from the original 3D digital representation of the room is visible to the second participant in the rendered 3D VR scene. Any part of the room that was present in the original 3D digital representation of the room becomes visibly replaced by the rendered 3D VR scene.

The present invention pertains to a system for implementing a shared mixed reality experience to a first participant and a second participant in a same physical room. The system comprises a first VR headset worn by the first participant in the physical room. The system comprises a second VR headset worn by the second participant in the physical room. Each VR headset as a forward-facing color camera stereo pair and a memory. The memory storing an original 3D digital representation of the physical room. The system comprises a first auxiliary processor adjacent to the first participant. The first auxiliary processor in wired connection to the first VR headset worn by the first participant. The system comprises a second auxiliary processor worn by the second participant. The second auxiliary processor in wired connection to the second VR headset worn by the second participant. The memory of the first headset worn by the first participant in communication through the wired connection with the first auxiliary processor worn by the first participant. The memory of the second headset worn by the second participant in communication through the wired connection with the second auxiliary processor worn by the second participant. The first auxiliary processor may be worn on a belt or armband of the first participant, or may be attached to a chair the first participant is sitting in or may be positioned under the chair in which the first participant may be sitting. The second auxiliary processor may be worn or positioned the same way by the second participant.

The present invention pertains to a method for implementing a shared mixed reality experience to participants in a same physical room. The method comprises the steps of storing an original 3D digital representation of the room in a memory. There is the step of calculating with a computer a rendered 3d VR scene for at least one VR headset worn by a participant of a plurality of headsets worn by participants in the room from a point of view of each of the participant's two eyes, based on the one VR headset's current position and orientation. Anything in the room that is different from the original 3D digital representation of the room is visible to the participant in the rendered 3D VR scene. Any part of the room that was present in the original 3D digital representation of the room becomes visibly replaced by the rendered 3D VR scene. Each VR headset has a forward-facing color camera stereo pair. The computer is in communication with at least the one VR headset. The memory is in communication with the computer. There is the step of displaying in the one VR headset the rendered VR scene.

DETAILED DESCRIPTION OF THE INVENTION

Figure 1:
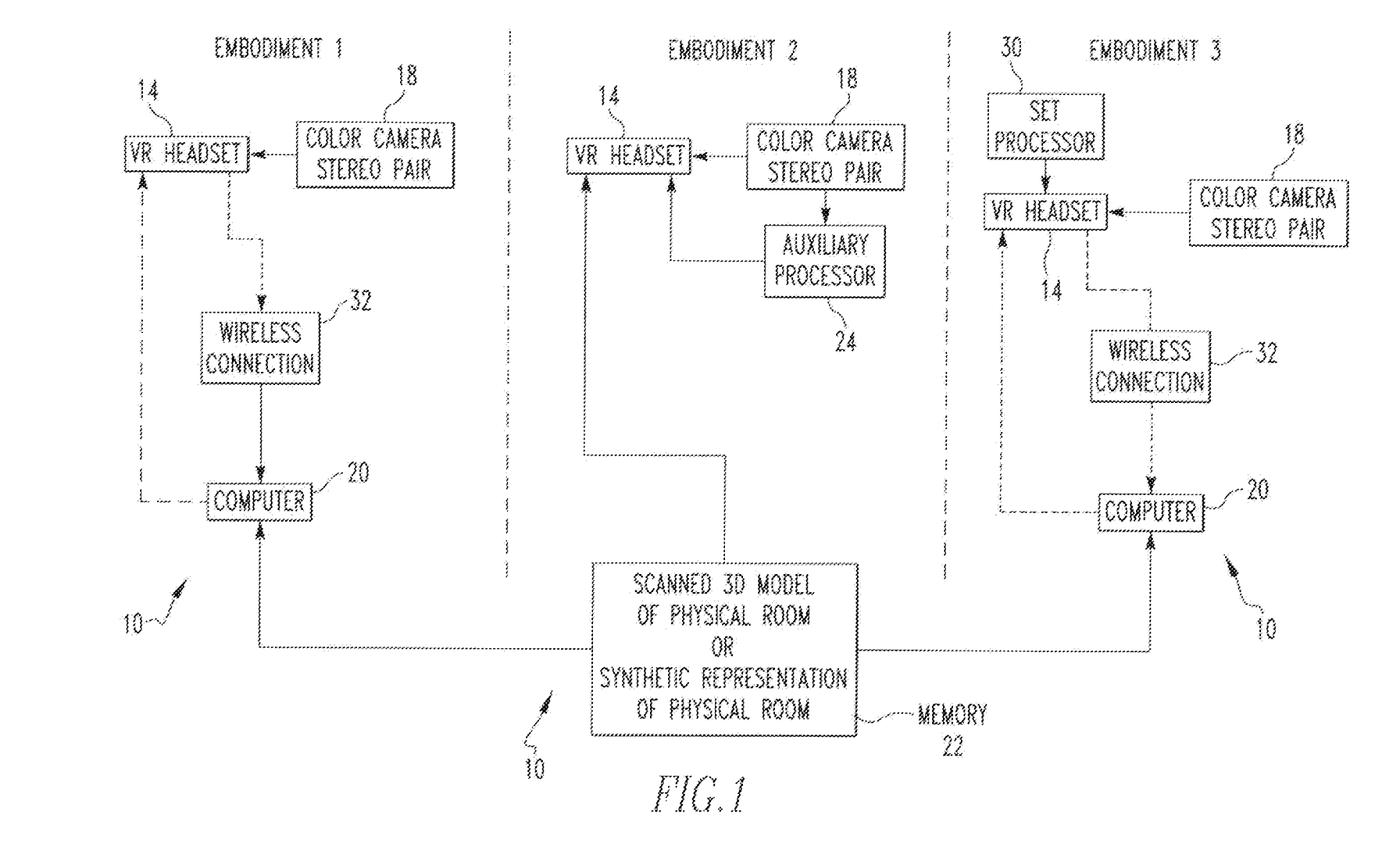
FIG. 1 is a representation of the three different embodiments of the present invention, all of which emanate from a common scanned 3D model of a physical room or a synthetic representation of a physical room.
Figure 2:
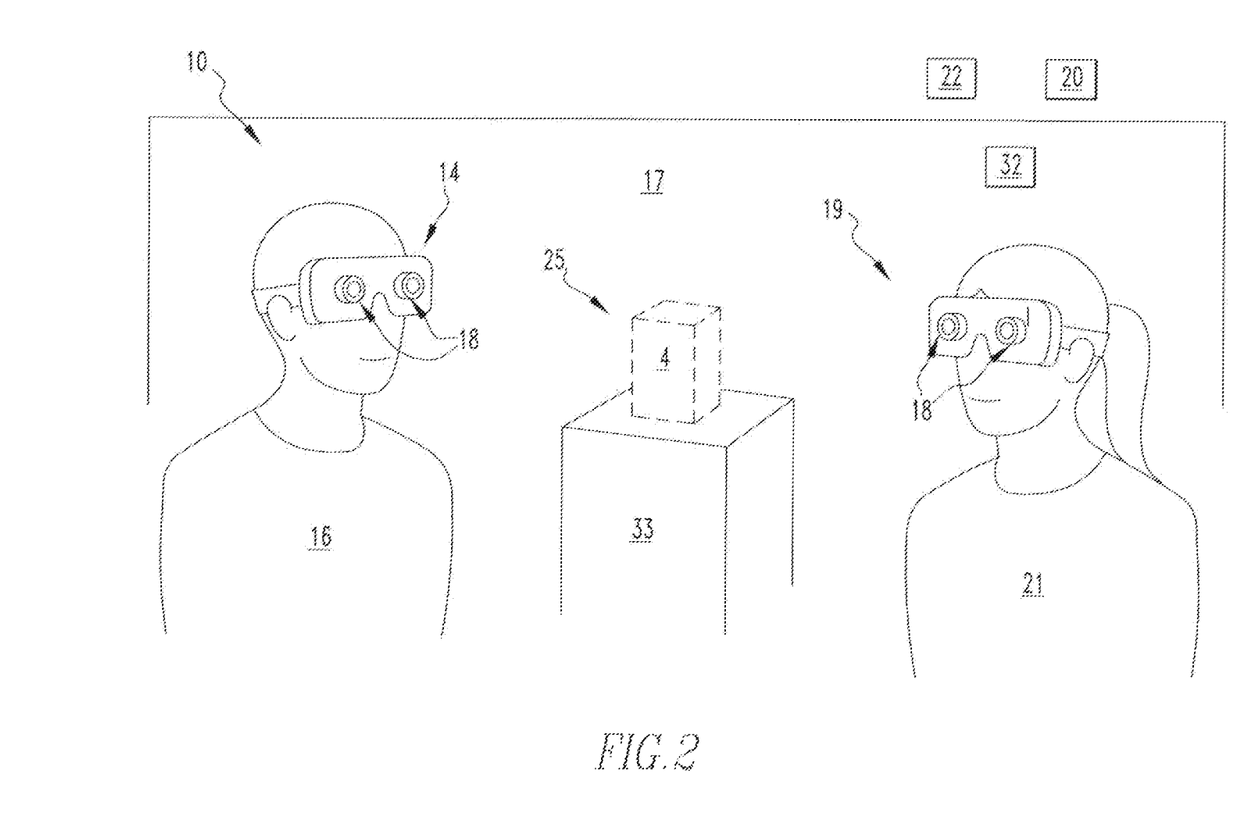
FIG. 2 is a representation of two participants in a physical room utilizing the first or third embodiments of the present invention.

Referring now to the drawings wherein like reference numerals refer to similar or identical parts throughout the several views, and more specifically to FIG. 1 thereof, there is shown a system 10 for implementing a shared mixed reality experience to a first participant 16 and a second participant 21 in a same physical room 17. The system 10 comprises a first VR headset having a forward-facing color camera stereo pair 18 worn by the first participant 16 in the physical room 17. The system 10 comprises a second VR headset having a forward-facing color camera stereo pair 18 worn by the second participant 21 in the physical room 17. The system 10 comprises a computer 20 in communication with the first and second VR headsets. The system 10 comprises a memory 22 in communication with the computer 20. The memory 22 storing an original 3D digital representation of the room 17. The computer 20 calculates a rendered 3D VR scene 25 for the first VR headset from a point of view of the first participant's two eyes, based on the first VR headset's current position and orientation. Anything in the room 17 that is different from the original 3D digital representation of the room 17 is visible to the first participant 16 in the rendered 3D VR scene 25. Any part of the room 17 that was present in the original 3D digital representation of the room 17 becomes visibly replaced by the rendered 3D VR scene 25. The computer 20 calculates a rendered 3D VR scene 25 for the second VR headset from a point of view of the second participant's two eyes, based on the second VR headset's current position and orientation. Anything in the room 17 that is different from the original 3D digital representation of the room 17 is visible to the second participant 21 in the rendered 3D VR scene 25. Any part of the room 17 that was present in the original 3D digital representation of the room 17 becomes visibly replaced by the rendered 3D VR scene 25.

The system 10 may include a modem 32 which is in wireless communication with the first and second VR headsets. The first headset 14 may send to the computer 20 at first periodic intervals two camera images captured by the stereo camera pair 18 of the first headset 14 and at second periodic intervals the first headset's position and orientation in the physical room 17. The second headset 19 may be send to the computer 20 at the first periodic intervals two camera images captured by the stereo camera pair 18 of the second headset 19 and at the second periodic intervals the second headset's own position and orientation in the physical room 17. The first and second periodic intervals of the first headset 14 may be different than the first and second periodic intervals of the second headset 19. The first periodic intervals may be different from the second periodic intervals. Each participant has two eyes which comprise a left eye and a right eye, and the computer may calculate the rendered VR scene 25 from a point of view of each of the participant's two eyes based on each participant's current position and orientation in the physical room 17.

The computer 20 may compute a distance using the two camera images, as seen at every pixel from each camera to a physical object 33 in the physical room 17. For each left eye image and right eye image of the computed rendered VR scene 25, at every pixel for which a first distance computed by the computer 20 is smaller by a threshold DELTA than a second distance to the nearest point within the stored original 3D digital representation of the room 17 as seen from that same pixel, the computer 20 may set that same pixel to a color of a corresponding pixel from a respective camera in the color camera stereo pair 18 to create a resulting left eye image and right eye image of the rendered VR scene 25. Each participant sees the physical object 33 and the physical room 17 and also sees a virtual object 4 in the VR scene 25.

The computer 20 may transmit to each VR headset, the resulting left eye image and right eye image of the VR scene 25 so anything in the physical room 17 that was not already part of original 3D digital representation of the room 17, are visible to each participant and any part of the physical room 17 that was present during the original 3D scan of the physical room 17 becomes visibly replaced by the rendered VR scene 25. Each headset may include a set processor 30, as shown in FIG. 1—embodiment 3, and the computer 20 wirelessly transmits back to each VR headset a silhouette image for each of the participant's right eye and left eye, which is a first color wherever the camera images from the cameras of the stereo camera pair 18 should be visible, and a second color different from the first color wherever images from the rendered VR scene 25 should be visible. The silhouette image is used by the set processor 30 on each VR headset to selectively set each pixel of the rendered 3D VR scene 25 to either a corresponding pixel of the camera image from the camera wherever the silhouette image is the first color or the corresponding pixel from the rendered 3D VR scene 25 wherever the silhouette image is the color.

Figure 3:
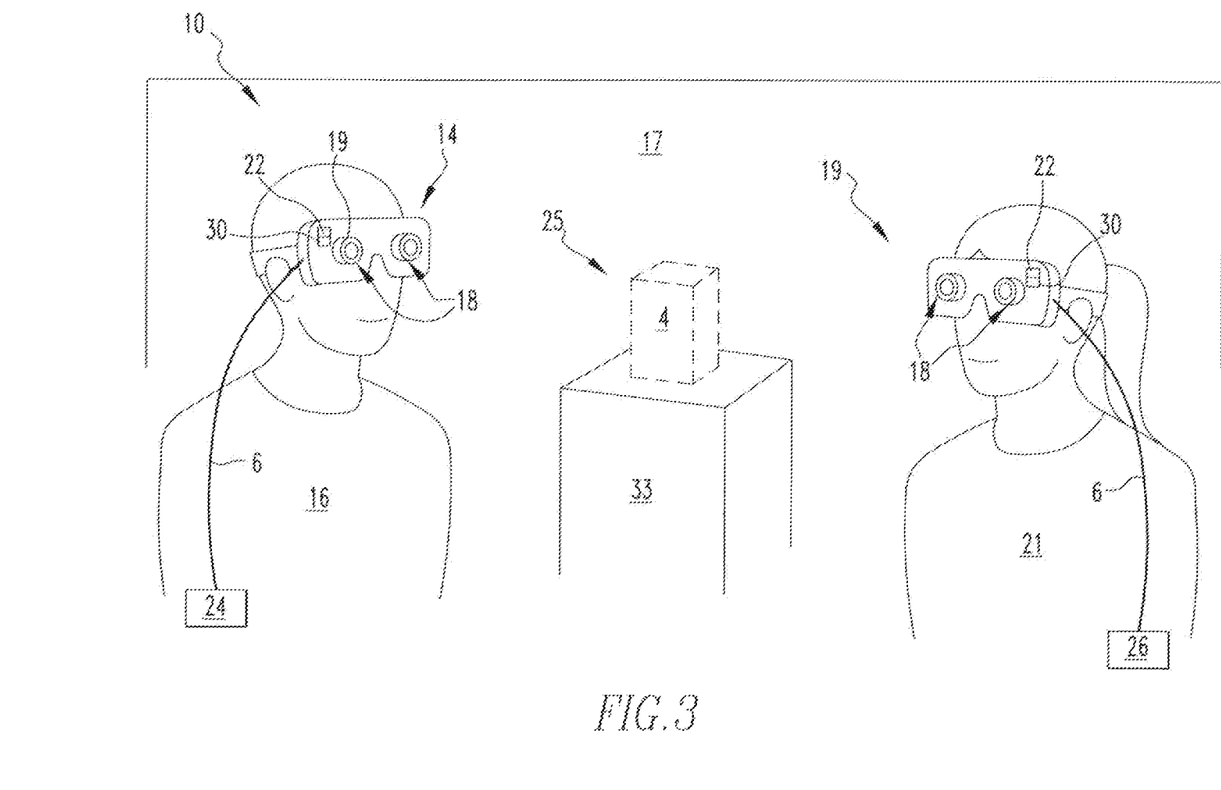
FIG. 3 is a representation of two participants in the physical room utilizing the second embodiment of the present invention.

The present invention pertains to a system 10 for implementing a shared mixed reality experience to a first participant 16 and a second participant 21 in a same physical room 17, as shown in FIG. 1, embodiment 2 and FIG. 3. The system 10 comprises a first VR headset worn by the first participant 16 in the physical room 17. The system 10 comprises a second VR headset worn by the second participant 21 in the physical room 17. Each VR headset as a forward-facing color camera stereo pair 18 and a memory 22. The memory 22 storing an original 3D digital representation of the physical room 17. The system 10 comprises a first auxiliary processor 24 adjacent to the first participant 16. The first auxiliary processor 24 in wired connection 6 to the first VR headset worn by the first participant 16. The system 10 comprises a second auxiliary processor 26 worn by the second participant 21. The second auxiliary processor 26 in wired connection 6 to the second VR headset worn by the second participant 21. The memory 22 of the first headset 14 worn by the first participant 16 in communication through the wired connection 6 with the first auxiliary processor 24 worn by the first participant 16. The memory 22 of the second headset 19 worn by the second participant 21 in communication through the wired connection 6 with the second auxiliary processor 26 worn by the second participant 21. The first auxiliary processor 24 may be worn on a belt or armband of the first participant 16, or may be attached to a chair the first participant 16 is sitting in or may be positioned under the chair in which the first participant 16 may be sitting. The second auxiliary processor 26 may be worn or positioned the same way by the second participant 21.

The first auxiliary processor 24 worn by the first participant 16 calculates a rendered 3D VR scene 25 for the first headset 14 worn by the first participant 16 from a point of view of the first participant's two eyes, based on the first VR headset's current position and orientation. Anything in the room 17 that is different from the original 3D digital representation of the room 17 is visible to the first participant 16 in the rendered 3D VR scene 25. Any part of the room 17 that was present in the original 3D digital representation of the room 17 becomes visibly replaced by the rendered 3D VR scene 25. The second auxiliary processor 26 worn by the second participant 21 calculates a rendered 3D VR scene 25 for the second headset 19 worn by the second participant 21 from a point of view of the second participant's two eyes, based on the second VR headset's current position and orientation. Anything in the room 17 that is different from the original 3D digital representation of the room 17 is visible to the second participant 21 in the rendered 3D VR scene 25. Any part of the room 17 that was present in the original 3D digital representation of the room 17 becomes visibly replaced by the rendered 3D VR scene 25.

The first headset 14 may send to the first auxiliary processor 24 at first periodic intervals two camera images captured by the stereo camera pair 18 of the first headset 14 and at second periodic intervals the first headset's position and orientation in the physical room 17. The second headset 19 sends to the second auxiliary processor 26 at the first periodic intervals two camera images captured by the stereo camera pair 18 of the second headset 19 and at the second periodic intervals the second headset's own position and orientation in the physical room 17. Each participant has two eyes which comprise a left eye and a right eye, and the first auxiliary processor 24 may calculate the rendered VR scene 25 from a point of view of each of the first participant's two eyes based on the first participant's current position and orientation in the physical room 17. The second auxiliary processor 26 may calculate the rendered VR scene 25 from a point of view of each of the second participant's two eyes based on the second participant's current position and orientation in the physical room 17.

The first auxiliary processor 24 may compute a distance using the two camera images of the first head set, as seen at every pixel from each camera of the first head set to a physical object 33 in the physical room 17. The second auxiliary processor 26 may compute a distance using the two camera images of the second head set, as seen at every pixel from each camera of the second head set to the physical object 33 in the physical room 17. For each left eye image and right eye image of the computed rendered VR scene 25, at every pixel for which a first distance computed by the first auxiliary processor 24 is smaller by a threshold DELTA than a second distance to the nearest point within the stored original 3D digital representation of the room 17 as seen from that same pixel. The first auxiliary processor 24 sets that same pixel to a color of a corresponding pixel from a respective camera in the color camera stereo pair 18 of the first head set to create a resulting left eye image and right eye image of the rendered VR scene 25.

The first auxiliary processor 24 for the right eye of the first participant 16 may render the right eye image as a texture mapped onto the rendering of a 3D geometry of the physical room 17 in a depth buffer in the memory 22 and may render a computed stereo depth image as a 3D surface into the depth buffer, displaced away from the headset by DELTA. The first auxiliary processor 24 may use the right camera 19 image from the right camera 19 as a texture that is mapped onto the 3D surface when rendering the right eye image where the right eye camera image appears at pixels where the right camera 19 is seeing something nearer than what is at a corresponding pixel in the rendered VR scene 25. The rendered VR scene 25 may appear at pixels where the right camera 19 is seeing something that is not nearer than what is at the corresponding pixel in the rendered VR scene 25.

The present invention pertains to a method for implementing a shared mixed reality experience to participants in a same physical room 17. The method comprises the steps of storing an original 3D digital representation of the room 17 in a memory 22. There is the step of calculating with a computer 20 a rendered 3D VR scene 25 for at least one VR headset worn by a participant of a plurality of headsets worn by participants in the room 17 from a point of view of each of the participant's two eyes, based on the one VR headset's current position and orientation. Anything in the room 17 that is different from the original 3D digital representation of the room 17 is visible to the participant in the rendered 3D VR scene 25. Any part of the room 17 that was present in the original 3D digital representation of the room 17 becomes visibly replaced by the rendered 3D VR scene 25. Each VR headset has a forward-facing color camera stereo pair 18. The computer 20 is in communication with at least the one VR headset. The memory 22 is in communication with the computer 20. There is the step of displaying in the one VR headset the rendered VR scene 25.

The invention is a technique whereby multiple participants who are sharing a VR experience in the same unprepared physical room 17 can continue to appear to all other participants as their true physical selves, rather than appearing to each other as synthetic avatars, and also so that all participants can see and manipulate selected physical objects in the room 17 such that those objects likewise retain their true physical appearance to all participants.

Physical Components

One or more VR headsets, each of which may have a transmitter and receiver signals, such as data or instructions.
  A forward-facing color camera stereo pair 18 incorporated into each VR headset
  An auxiliary depth-from-stereo processor for each VR headset
  A means of wireless data connection such as Wifi
  A computer 20

User Experience

One or more participants in the same room 17 share a VR experience. For every participant, the physical room 17 itself is visually replaced by a shared computer-generated VR world, yet every participant in the room 17 continues to see all the other participants in their actual positions in the room 17. Objects 33, which can be furniture, can be added to the room 17, and these objects 33 also continue to be visible to all participants in their actual positions in the room 17. Everywhere that a participant looks, where there is not another person or an added object 33, participants will see the shared computer-generated VR world, rather than the physical room 17 itself.

Enabling Technology

One or more participants in a room 17 are each wearing a VR headset which incorporates a forward-facing color camera stereo pair 18. Three alternative embodiments are described.

Embodiment 1

Beforehand, the room 17 has been 3D scanned by using any device that is standard in the field for obtaining 3D scans of rooms, such as a Matterport scanner. The resulting 3D digital representation of the geometry of the room 17 is stored in a memory 22 in communication with the computer 20.

Each VR headset is connected wirelessly to the computer 20. At periodic interactive frame rate intervals, which in one embodiment can be 30 times per second, the two images captured by the stereo camera pair 18 are sent wirelessly from the headset to the computer 20.

Wherein each headset sends to the computer 20 at periodic intervals two images captured by the stereo camera pair 18 and each headset's own position and orientation.

Wherein the computer 20 calculates the VR scene 25 from a point of view of each of the participant's two eyes of each participant based on each participant's current position and orientation in the room 17.

Wherein the computer 20 computes a distance using the two images, as seen at every pixel from each camera to a physical object 33 in the physical room 17.

Wherein for each of the left eye and right eye images of the computed VR scene at every pixel for which a first distance computed by the computer 20 is smaller by a threshold DELTA than a second distance to the nearest point within the stored 3D model as seen from that same pixel, the computer 20 sets that same pixel to a color of a corresponding pixel from a respective camera in the color camera stereo pair 18 to create a resulting left eye image and right eye image of the VR scene 25.

Wherein the computer 20 transmits to each VR headset, the resulting left eye image and right eye image of the VR scene 25 so anything in the physical room 17 that was not already part of the original 3D scan of the room 17, are visible to each participant and any part of the physical room 17 that was present during the original 3D scan of the physical room 17 becomes visibly replaced by the VR scene 25.

The headset itself performs inside out tracking of its own position and orientation using standard techniques, such as have been employed by commercially available VR headsets including the Quest 2 and the Vive Focus with, for instance, an inside out tracking module. The VR headset then wirelessly transmits its position and orientation to the computer 20 at periodic intervals, which in one embodiment can be 90 times per second.

The computer 20 calculates a VR scene 25 from the point of view of each of the participant's two eyes, based on the VR headset's current position and orientation.

In addition, the two stereo images are used by the computer 20 to rapidly compute the distance as seen at every pixel from the camera to the nearest object 33 in the physical room 17 using a depth-from-stereo technique that is known in the art, such as the technique of [A Lightweight Real-time Stereo Depth Estimation Network with Dynamic Upsampling Modules. Y Deng, J Xiao, S Z Zhou VISIGRAPP (5: VISAPP), 701-710] incorporated by reference herein.

For each of the left eye and right eye images of the computed VR scene 25, at every pixel for which the distance computed by stereo depth estimation is smaller by some threshold DELTA than the distance to the nearest point within the stored 3D model as seen from that same pixel, the computer 20 sets that pixel to the color of the corresponding pixel from the respective camera in the color camera stereo pair 18. In one embodiment, DELTA can be 5 cm.

The resulting left and right eye images of the rendered VR scene 25, thus modified by the selective insertion of pixel values from the left and right cameras, respectively, of the color camera stereo pair 18, are then transmitted wirelessly from the computer 20 to the VR headset to be viewed by the participant in the VR headset.

In this way, anything in the room 17 that was not already part of the originally scanned room 17, such as other people in the room 17 or objects that have been added to the room 17 subsequent to 3D scanning, are visible to the participant. In contrast, any part of the room 17 that was present during the original 3D scan of the room 17 becomes visibly replaced by the rendered 3D VR scene 25.

Embodiment 2

In an alternate second embodiment, the stereo camera pair 18 is connected via a wired connection 6 to a dedicated auxiliary processor which can be carried or worn by the participant. This auxiliary processor uses the stereo disparity between the two camera images of the color camera stereo pair 18 to compute stereo depth. The auxiliary processor then sends the resulting depth image, also via a wired connection 6, to a set processor 30 in the VR headset. In this embodiment, the data for the 3D geometry of the physical room 17 has been preloaded onto the VR headset itself.

In this embodiment the VR headset renders the 3D geometry of the physical room 17 as seen from the current position and orientation of the VR headset in order to create a depth image to use for comparison.

As in the first embodiment, for each of the left eye and right eye images of the computed VR scene 25, at every pixel for which the distance computed by stereo depth estimation is smaller by some threshold DELTA than the corresponding distance to the nearest point within the stored 3D model as seen from that pixel, the processor on the VR headset sets that pixel to the color of the corresponding pixel from the respective camera in the stereo camera pair 18.

One way to implement this is to, for each eye:
(1) render the VR scene 25 from that eye;
(2) project the image of that rendered scene 25 as a texture mapped onto the rendering of the 3D geometry of the physical room 17 in a depth buffer;
(3) render the computed stereo depth image as a 3D surface into the same depth buffer, displaced away from the headset by DELTA;
(4) use the camera image from the left and right cameras, respectively, as a texture that is mapped onto that surface when rendering the result for the corresponding eye.

The result will be that the camera image will appear at pixels where the camera is seeing something nearer than what is at the corresponding pixel in the VR scene 25, and the VR scene 25 will appear at pixels where the camera is seeing something that is not nearer than what is at the corresponding pixel in the VR scene 25.

In this second embodiment, there is no need for either an external computer 20 or a wireless connection. Each VR headset, together with its associated color stereo camera pair 18 and dedicated auxiliary depth-from-stereo processor, functions as a fully self-contained unit, with no need to communicate with any other devices. If there is dynamic content being displayed in the VR scene 25, a synchronization signal may be sent to all the headsets of all the participants, so the participants all view the VR scene 25 as it is presented at the same time, except for each participant's unique position in the room 17. This is because all the participants have the same equipment and software and VR scene 25 preloaded into their memories, so VR scene 25 is constantly changing at the same time and the same way, except for the participant's unique position, which is taken into account by the headset and auxiliary processor of each participant as the VR scene 25 is displayed for each participant.

Embodiment 3

In this embodiment, the VR scene 25 is rendered locally on the headset of the VR processor, but the determination, for each of the participant's two eyes, of which pixels are showing the corresponding image from the color stereo camera pair 18, versus which pixels are showing the rendered VR scene 25, is computed on a computer 20 that is connected via wireless connection to the VR headset, as in embodiment 1. This embodiment has the advantage of not requiring extra local computation on the person of each participant of depth from stereo as would be needed for embodiment 2, while also requiring only a fraction of the wireless bandwidth that would be required to transmit all of the high resolution rendered scenes from the computer 20 to all of the VR headsets as would be the case for embodiment 1. Because of this lower wireless bandwidth requirement, many more participants can be accommodated simultaneously in the same room 17, given the same total wireless bandwidth, than would be the case for embodiment 1.

In this embodiment, the images from the stereo camera pair 18 are transmitted wirelessly to the computer 20. The computer 20 then performs a depth from stereo computation as in scenario 1, and wirelessly transmits back to the VR headset a silhouette image for each of the participant's two eyes, which in one embodiment is black wherever the image from the camera should be visible, and white wherever the image from the rendered VR scene 25 should be visible. This silhouette image is then used by the processor on the VR headset to selectively set each pixel of the displayed image to either the corresponding pixel of the image from the camera (wherever the silhouette image is black) or the corresponding pixel from the rendered VR scene 25 (wherever the silhouette image is white).

Because the images that need to be transmitted between the computer 20 and the VR headset for depth computation are typically much lower resolution than the images of the final rendered VR scene 25, this method requires only a fraction of the total wireless bandwidth required to implement embodiment 1.

Alternate Room 17 Model

For any of the above scenarios, a synthetic description of the physical room 17 geometry can be used as a substitute for a scan of the actual physical room 17. To implement this, a 2D shape, such as a rectangle, can be defined as a floor shape which is known to fit entirely within the floorplan of the physical room 17. This 2D shape is then extruded in the vertical direction to create a virtual room 17 volume. The boundary of that volume can be used to represent the geometry of the room. In one embodiment the height of the extrusion can be 10 feet.

In scenario 1, this synthetic room geometry description is stored on the computer 20. In scenario 2, this synthetic room geometry description is stored on the VR headset's processor.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for implementing a shared mixed reality experience to a first participant and a second participant in a same physical room comprising:
   a first VR headset having a forward-facing color camera stereo pair worn by the first participant in the physical room;
   a second VR headset having a forward-facing color camera stereo pair worn by the second participant in the physical room;
   a computer in communication with the first and second VR headsets; and
   a memory in communication with the computer, the memory storing an original 3D digital representation of the room, the computer calculates a rendered 3D VR scene for the first VR headset from a point of view of the first participant's two eyes, based on the first VR headset's current position and orientation, anything in the room that is different from the original 3D digital representation of the room is visible to the first participant in the rendered 3D VR scene, any part of the room that was present in the original 3D digital representation of the room becomes visibly replaced by the rendered 3D VR scene, the computer calculates a rendered 3D VR scene for the second VR headset from a point of view of the second participant's two eyes, based on the second VR headset's current position and orientation, anything in the room that is different from the original 3D digital representation of the room is visible to the second participant in the rendered 3D VR scene, any part of the room that was present in the original 3D digital representation of the room becomes visibly replaced by the rendered 3D VR scene;
   wherein the computer computes a distance using the two camera images, as seen at every pixel from each camera to a physical object in the physical room, and
   wherein for each left eye image and right eye image of the computed rendered VR scene, at every pixel for which a first distance computed by the computer is smaller by a threshold DELTA than a second distance to the nearest point within the stored original 3D digital representation of the room as seen from that same pixel, the computer sets that same pixel to a color of a corresponding pixel from a respective camera in the color camera stereo pair to create a resulting left eye image and right eye image of the rendered VR scene.

2. The system of claim 1 including a modem which is in wireless communication with the first and second VR headsets.

3. The system of claim 2 wherein the first headset sends to the computer at first periodic intervals two camera images captured by the stereo camera pair of the first headset and at second periodic intervals the first headset's position and orientation in the physical room, and the second headset sends to the computer at the first periodic intervals two camera images captured by the stereo camera pair of the second headset and at the second periodic intervals the second headset's own position and orientation in the physical room.

4. The system of claim 3 wherein each participant has two eyes which comprise a left eye and a right eye, and the computer calculates the rendered VR scene from a point of view of each of the participant's two eyes based on each participant's current position and orientation in the physical room.

5. The system of claim 3 wherein the computer transmits to each VR headset, the resulting left eye image and right eye image of the VR scene so anything in the physical room that was not already part of original 3D digital representation of the room, are visible to each participant and any part of the physical room that was present during the original 3D scan of the physical room becomes visibly replaced by the rendered VR scene.

6. The system of claim 5 wherein the first periodic intervals are different from the second periodic intervals.

7. The system of claim 6 wherein each headset includes a processor and the computer wirelessly transmits back to each VR headset a silhouette image for each of the participant's right eye and left eye, which is a first color wherever the camera images from the cameras of the camera image pair should be visible, and a second color different from the first color wherever images from the rendered VR scene should be visible, the silhouette image is used by the set processor on each VR headset to selectively set each pixel of the rendered 3D scene to either a corresponding pixel of the camera image from the camera of the camera image pair wherever the silhouette image is the first color or the corresponding pixel from the rendered 3D VR scene wherever the silhouette image is the second color.

8. The system of claim 2 wherein each headset includes a set processor and the computer wirelessly transmits back to each VR headset a silhouette image for each of the participant's right eye and left eye, which is a first color wherever the camera images from the camera should be visible, and a second color different from the first color wherever images from the rendered VR scene should be visible, the silhouette image is used by the set processor on each VR headset to selectively set each pixel of the rendered 3D scene to either a corresponding pixel of the camera image from the camera wherever the silhouette image is the first color or the corresponding pixel from the rendered 3D VR scene wherever the silhouette image is the second color.

9. A system for implementing a shared mixed reality experience to a first participant and a second participant in a same physical room comprising:
 a first VR headset worn by the first participant in the physical room;
 a second VR headset worn by the second participant in the physical room, each VR headset having a forward-facing color camera stereo pair and a memory, the memory storing an original 3D digital representation of the physical room;
 a first auxiliary processor adjacent to the first participant; and
 a second auxiliary processor worn by the second participant, the first auxiliary processor in wired connection to the first VR headset worn by the first participant, the second auxiliary processor in wired connection to the second VR headset worn by the second participant, the memory of the first headset worn by the first participant in communication through the wired connection with the first auxiliary processor worn by the first participant, the memory of the second headset worn by the second participant in communication through the wired connection with the second auxiliary processor worn by the second participant, the first auxiliary processor worn by the first participant calculates a rendered 3D VR scene for the first headset worn by the first participant from a point of view of the first participant's two eyes, based on the first VR headset's current position and orientation, anything in the room that is different from the original 3D digital representation of the room is visible to the first participant in the rendered 3D VR scene, any part of the room that was present in the original 3D digital representation of the room becomes visibly replaced by the rendered 3D VR scene, the second auxiliary processor worn by the second participant calculates a rendered 3D VR scene for the second headset worn by the second participant from a point of view of the second participant's two eyes, based on the second VR headset's current position and orientation, anything in the room that is different from the original 3D digital representation of the room is visible to the second participant in the rendered 3D VR scene, any part of the room that was present in the original 3D digital representation of the room becomes visibly replaced by the rendered 3D VR scene,
 wherein the first auxiliary processor computes a distance using the two camera images of the first head set, as seen at every pixel from each camera of the first head set to a physical object in the physical room, and the second auxiliary processor computes a distance using the two camera images of the second head set, as seen at every pixel from each camera of the second head set to the physical object in the physical room, and
 wherein for each left eye image and right eye image of the computed rendered VR scene, at every pixel for which a first distance computed by the first auxiliary processor is smaller by a threshold DELTA than a second distance to the nearest point within the stored original 3D digital representation of the room as seen from that pixel, the first auxiliary processor sets that pixel to a color of a corresponding pixel from a respective camera in the color camera stereo pair of the first head set to create a resulting left eye image and right eye image of the rendered VR scene.

10. The system of claim 9 wherein the first headset sends to the first auxiliary processor at first periodic intervals two camera images captured by the stereo camera pair of the first headset and at second periodic intervals the first headset's position and orientation in the physical room, and the second headset sends to the second auxiliary processor at the first periodic intervals two camera images captured by the stereo camera pair of the second headset and at the second periodic intervals the second headset's own position and orientation in the physical room.

11. The system of claim 10 wherein each participant has two eyes which comprise a left eye and a right eye, and the first auxiliary processor calculates the rendered VR scene from a point of view of each of the first participant's two eyes based on the first participant's current position and orientation in the physical room, and the second auxiliary processor calculates the rendered VR scene from a point of view of each of the second participant's two eyes based on the second participant's current position and orientation in the physical room.

12. The system of claim 11 wherein the first auxiliary processor for the right eye of the first participant renders the right eye image as a texture mapped onto the rendering of a 3D geometry of the physical room in a depth buffer of the memory and renders a computed stereo depth image as a 3D surface into the depth buffer, displaced away from the headset by DELTA, and uses a right camera image from a right camera of the camera stereo pair of the first head set as a texture that is mapped onto the 3D surface when rendering the right eye image where the right eye camera image appears at pixels where the right camera is seeing something nearer than what is at a corresponding pixel in the rendered VR scene, and the rendered VR scene appears at pixels where the right camera is seeing something that is not nearer than what is at the corresponding pixel in the rendered VR scene.

13. The system of claim 12 wherein the original 3D representation of the physical room is synthetic.

14. The system of claim 8 wherein the original 3D representation of the physical room is synthetic.

15. A method for implementing a shared mixed reality experience to participants in a same physical room comprising:
 storing an original 3D digital representation of the room in a memory;
 calculating with a computer a rendered 3d VR scene for at least one VR headset worn by a participant of a plurality of headsets worn by participants in the room from a point of view of each of the participant's two eyes, based on the one VR headset's current position and orientation, anything in the room that is different from the original 3D digital representation of the room is visible to the participant in the rendered 3D VR scene, any part of the room that was present in the original 3D digital representation of the room becomes visibly replaced by the rendered 3D VR scene, each VR headset having a forward facing color camera stereo pair, the computer in communication with at least the one VR headset, the memory in communication with the computer; and displaying in the one VR headset the rendered VR scene, wherein the computer computes a distance using the two camera images, as seen at every pixel from each camera to a physical object in the physical room, and wherein for each left eye image and right eye image of the computed rendered VR scene, at every pixel for which a first distance computed by the computer is smaller by a threshold DELTA than a second distance to the nearest point within the stored original 3D digital representation of the room as seen from that same pixel, the computer sets that same pixel to a color of a corresponding pixel from a respective camera in the color camera stereo pair to create a resulting left eye image and right eye image of the rendered VR scene.

\* \* \* \* \*